United States Patent
McDaniel, Sr.

[11] Patent Number: 5,501,029
[45] Date of Patent: Mar. 26, 1996

[54] FISHING REEL COVER

[75] Inventor: Cecil G. McDaniel, Sr., Grenada, Miss.

[73] Assignees: Tim McDaniel; Robert D. Willis, both of Grenada, Miss.

[21] Appl. No.: 231,826

[22] Filed: Apr. 25, 1994

[51] Int. Cl.[6] .................................................. A01K 97/08
[52] U.S. Cl. ............................ 43/26; D3/260; 206/315.11
[58] Field of Search .................................. 43/20, 25, 26; 206/315.11; 224/162, 922, 901; D3/260, 229, 134, 139, 199; 150/154; 74/558

[56] References Cited

U.S. PATENT DOCUMENTS

| | | |
|---|---|---|
| D. 280,657 | 9/1985 | Hatch ................................. D22/141 |
| 1,876,993 | 9/1932 | Manning ................................ 74/558 |
| 2,532,119 | 11/1950 | Reynolds ............................ 224/922 X |
| 2,618,880 | 11/1952 | Sourek ................................... 43/26 |
| 2,932,334 | 4/1960 | Steen .................................. 206/317 |
| 3,762,592 | 10/1973 | Mayes ................................ 220/4.21 |
| 4,136,478 | 1/1979 | Wycosky ............................... 43/26 |
| 4,414,692 | 11/1983 | Dzierson et al. .................. 224/901 X |
| 4,641,454 | 2/1987 | Ray et al. ............................. 43/26 |
| 4,691,469 | 9/1987 | Alsobrook et al. .................. 43/54.1 |
| 4,726,141 | 2/1988 | McBride et al. ....................... 43/26 |
| 4,876,819 | 10/1989 | Clifford ................................. 43/26 |
| 4,946,034 | 8/1990 | Matsubara ......................... 206/315.11 |

FOREIGN PATENT DOCUMENTS 1140565   7/1957   France ................................... 43/25

Primary Examiner—P. Austin Bradley
Assistant Examiner—Jeanne M. Elpel
Attorney, Agent, or Firm—Walker, McKenzie & Walker

[57] ABSTRACT

A fishing reel cover for covering a fishing reel including a first side member, a second side member, and a rotatable spool extending between the first and second side members with each of the first and second side members having an outer perimeter wall. The fishing reel cover includes a flexible body member for extending around the outer perimeter walls of the first and second side members of the fishing reel and for covering the rotatable spool of the fishing reel.

11 Claims, 4 Drawing Sheets

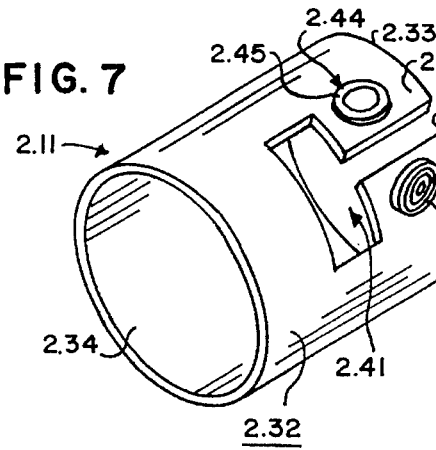
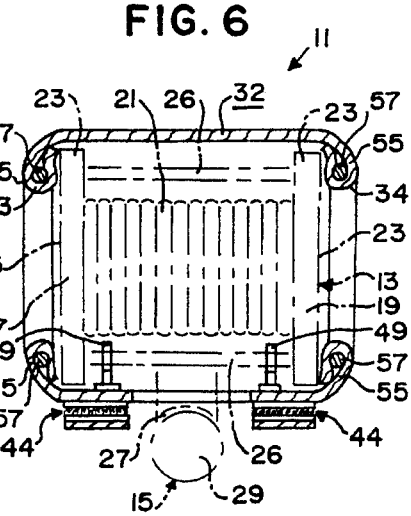
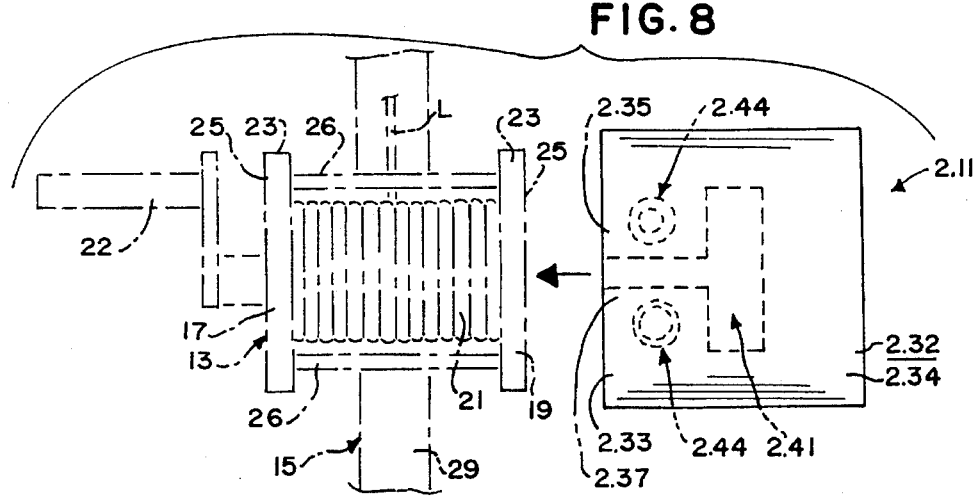
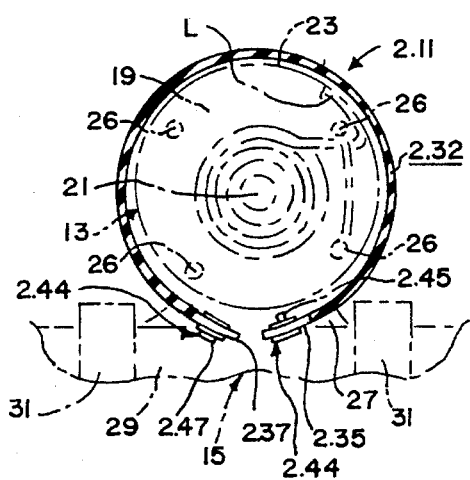
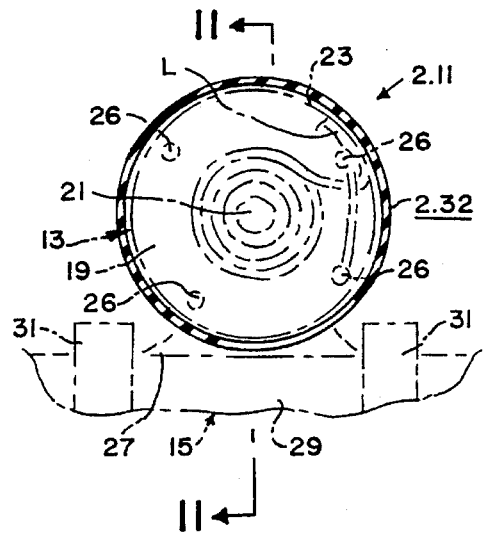

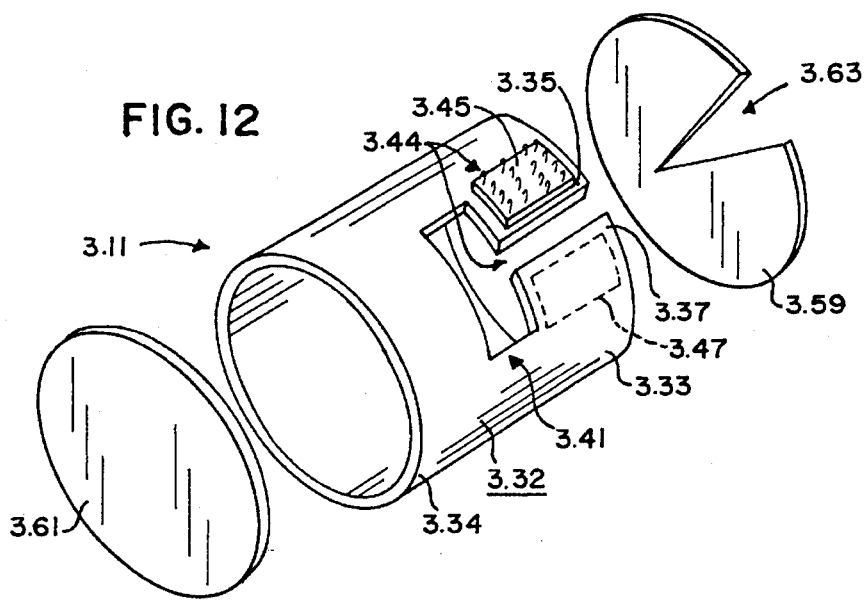
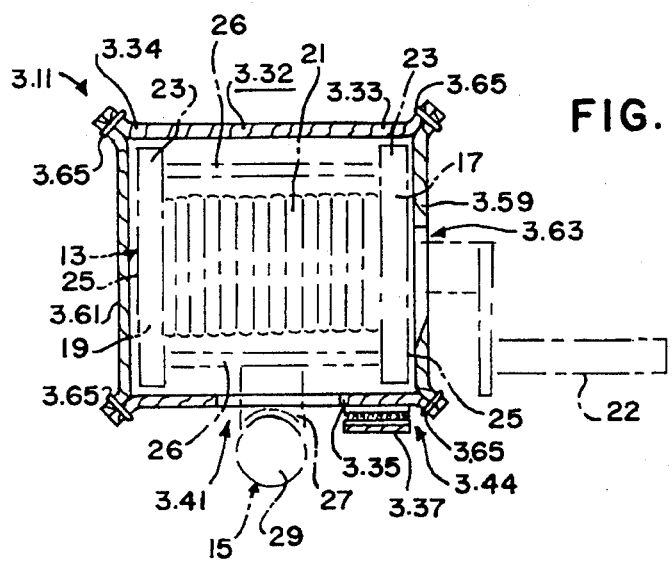
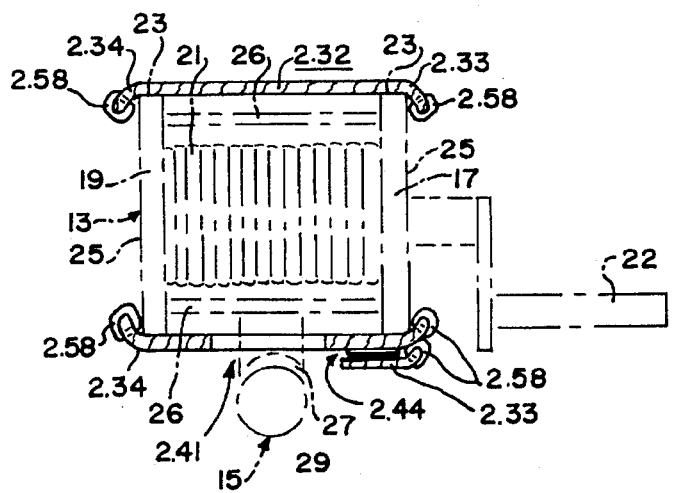

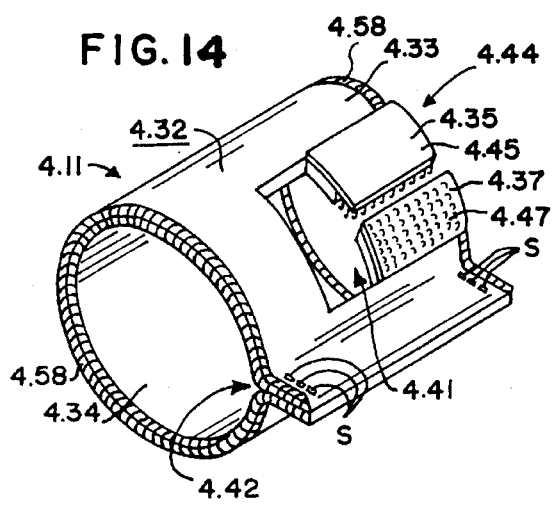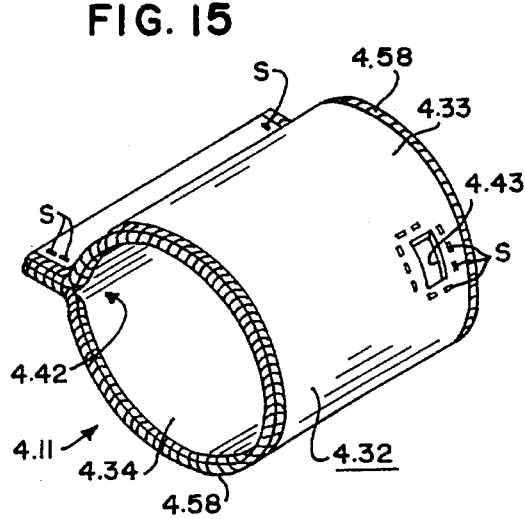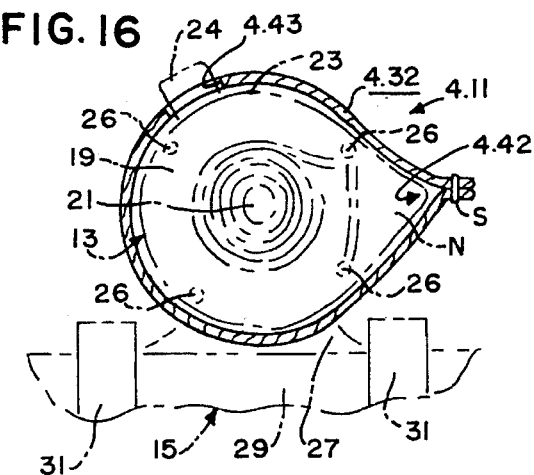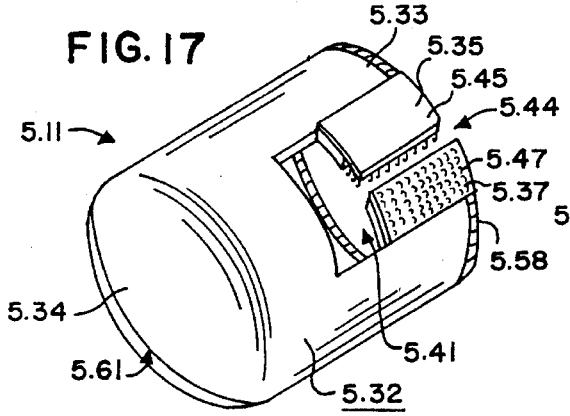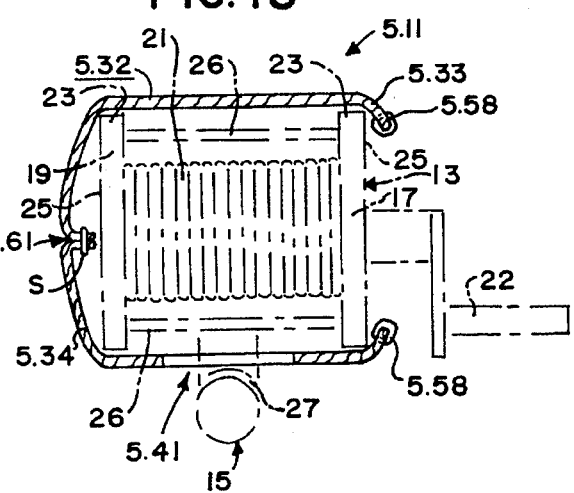

FISHING REEL COVER

BACKGROUND OF THE INVENTION

1. Field of the Invention: The present invention relates, in general, to a protective cover for a fishing reel and, more specifically, to a flexible cover that can be easily and quickly pulled or wrapped over the rotatable spool portion of a casting reel.

2. Information Disclosure Statement: Various means have heretofore been used as a protective means for fishing reels. A preliminary patentability search produced the following patents which appear to be relevant to the present invention:

Sourek, U.S. Pat. No. 2,618,880, issued Nov. 25, 1952, discloses a fishing reel cover consisting of a flat sheet of flexible material having an eccentrically located slit extending therethrough for receiving the butt-end of a fishing rod. After the butt-end of a fishing rod has been inserted through the slit, the flexible material can then be folded over a fishing reel mounted on the fishing rod.

Steen, U.S. Pat. No. 2,932,334, issued Apr. 12, 1960, discloses a detachable cover for the breech and trigger mechanism of rifles, shotguns and the like.

Mayes, U.S. Pat. No. 3,762,592, issued Oct. 2, 1973, discloses a protective cover for a fishing reel of the spin cast or spinning type. The Mayes fishing reel cover consists of two substantially rigid halves which readily snap together to enclose a fishing reel and can be mounted on the reel while the reel is attached to a fishing rod. A flexible boot is provided on one of the halves for receiving the reel crank.

Wycosky, U.S. Pat. No. 4,136,478, issued Jan. 30, 1979, discloses a bag for receiving the handle portion of a fishing rod and an attached fishing reel. An elastic band is used to close the open end of the bag. The elastic band terminates in a hook that removably engages an eye of the fishing rod.

Hatch, U.S. Pat. No. Des. 280,657, issued Sep. 17, 1985, discloses a front cover for a spin-cast fishing reel.

Alsobrook et al., U.S. Pat. No. 4,691,469, issued Sep. 8, 1987, discloses a plurality of soft pack fishing tackle units which are customized and color coded for carrying specific fishing tackle, and which can all be carried in a master bag.

McBride et al., U.S. Pat. No. 4,726,141, issued Feb. 23, 1988, discloses a carrying case for one or two assembled fishing rods and reels. The carrying case includes a pair of pouches of flexible material which are connected along an extended midseam with each pouch having oppositely oriented carrying handles and an opening through which the end of a rod and the reel is selectively received and which openings are closable around the rods by interengagable surface closures.

Nothing in the known prior art discloses or suggests the present invention. More specifically, nothing in the known prior art discloses or suggests a fishing reel cover for use in combination with a rotatable spool-type fishing reel and including a flexible body member for extending around the outer perimeter walls of the first and second side members of the fishing reel and for covering the rotatable spool of the fishing reel.

SUMMARY OF THE INVENTION

The present invention provides a cover or enclosure for protecting a fishing reel while the fishing reel is attached to a fishing rod. A basic concept of the present invention is to provide a flexible body member that can be formed into a generally cylindrical shape for encircling the face portion of a so-called level-wind, bait-casting type fishing reel to protect the rotatable spool and associated parts from the elements when the fishing reel is not being used but while the fishing reel is attached to a fishing rod.

BRIEF DESCRIPTION OF THE DRAWINGS

FIG. 6 is a somewhat diagrammatic sectional view substantially as taken on line 6—6 of FIG. 4 with portions thereof omitted for clarity but showing another alternate construction of the body member of the fishing reel cover of FIG. 1.

FIG. 7 is a perspective view of a second embodiment of the fishing reel cover of the present invention.

FIG. 8 is a top plan view of the fishing reel cover of FIG. 7, shown being attached to a fishing reel that is mounted to a fishing rod.

FIG. 9 is a sectional view of the fishing reel cover of FIG. 7, shown in a further progression of attachment to a fishing reel than shown in FIG. 8.

FIG. 10 is similar to FIG. 9 but shows the fishing reel cover of FIG. 7 fully attached to the fishing reel.

FIG. 11 is a somewhat diagrammatic sectional view substantially as taken on line 11—11 of FIG. 10 with portions thereof omitted for clarity but showing an alternate construction of the body member of the fishing reel cover of FIG. 7.

FIG. 12 is an exploded perspective view of a third embodiment of the fishing reel cover of the present invention.

FIG. 13 is a somewhat diagrammatic sectional view of the third embodiment of the fishing reel cover, showing the fishing reel cover of FIG. 12 fully attached to a fishing reel.

FIGS. 14–16 show a fourth embodiment of the fishing reel cover of the present invention.

FIGS. 17–18 show a fifth embodiment of the fishing reel cover of the present invention.

DESCRIPTION OF THE PREFERRED EMBODIMENTS

Figure 1:
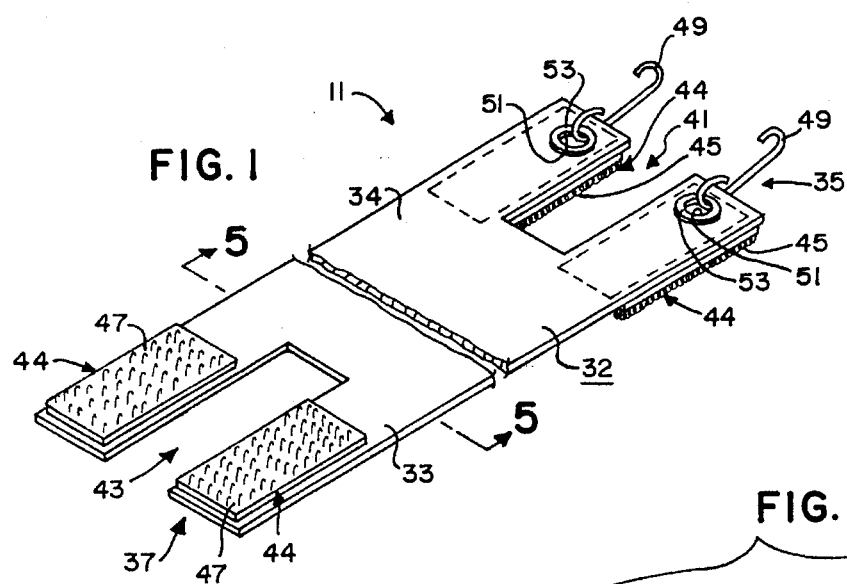
FIG. 1 is a perspective view of a first embodiment of the fishing reel cover of the present invention.

A first preferred embodiment of the fishing reel cover of the present invention is shown in FIGS. 1–6, and identified by the numeral 11, a second preferred embodiment of the fishing reel cover of the present invention is shown in FIGS. 7–11 and identified by the numeral 2.11, a third embodiment of the fishing reel cover of the present invention is shown in FIGS. 12–13 and identified by the numeral 3.11, a fourth embodiment of the fishing reel cover of the present invention is shown in FIGS. 14–16 and identified by the numeral 4.11, and a fifth embodiment of the fishing reel cover of the present invention is shown in FIGS. 17–18 and identified by the numeral 5.11. The fishing reel covers 11, 2.11, 3.11, 4.11, 5.11 are especially designed for use in combination with a fishing reel 13 and a fishing rod 15 to cover critical areas of the fishing reel 13 and to protect those critical areas of the fishing reel 13 from the elements when the fishing reel 13 is attached to the fishing rod 15 but is not in use.

The fishing reel 13 includes a first side member 17, a second side member 19, and a rotatable spool 21 extending between the first and second side members 17, 19. A crank 22 is typically provided for allowing the user of the fishing reel 13 to rotate the spool 21 and cause fishing line L to be reeled onto the spool 21, etc., as will now be apparent to those skilled in the art. Each of the first and second side members 17, 19 has an outer perimeter wall 23 and an outside face wall 25. The fishing reel 13 preferably includes at least one cross bar member 26 extending between the first and second side members 17, 19 thereof. Four spaced apart cross bar members 26 are shown in FIGS. 3, 4, 9 and 10. The fishing reel 13 preferably includes a mounting base shoe 27 attached to one or more of the lowermost cross bar members 26 or the like for being secured to the fishing rod 15. The fishing reel 13 is preferably a typical level wind, bait casting type of any various specific constructions now apparent to those skilled in the art.

The fishing rod 15 preferably includes an elongated flexible rod or shaft member (not shown) and a handle or grip portion 29 at one end of the shaft member with mounting means 31 located on or adjacent the grip portion 29 for coacting with the mounting base shoe 27 of the fishing reel 13 to secure the fishing reel 13 to the fishing rod 15. The fishing rod 15 is preferably a typical bait casting type of any various specific constructions now apparent to those skilled in the art.

The fishing reel cover 11 includes an elongated, flexible body member 32 for extending around or encircling the outer perimeter walls 23 of the first and second side members 17, 19 of the fishing reel 13 and for covering the rotatable spool 21 of the fishing reel 13. The body member 32 has a first side edge portion 33 and a second side edge portion 34. The body member 32 preferably includes a first end portion 35 for extending in one direction around the fishing reel 13, and a second end portion 37 for extending in an opposite direction around the fishing reel 13. The first end portion 35 of the body member 32 of the fishing reel cover 11 preferably has a slot 41 therein for receiving the mounting base shoe 27 of the fishing reel 13 when the body member 32 extends around the fishing reel 11 with the mounting base shoe 27 of the fishing reel 13 attached to the fishing rod 15 as clearly shown in FIGS. 3 and 4. The second end portion 37 of the body member 32 of the fishing reel cover 11 may have a slot 43 therein for receiving the mounting base shoe 27 of the fishing reel 13 when the body member 32 extends around the fishing reel 11 with the mounting base shoe 27 of the fishing reel 13 attached to the fishing rod 15 as clearly shown in FIG. 4. The body member 32 may be constructed in various manners and in various sizes, out of various materials, as will now be apparent to those skilled in the art. Preferably, the body member 32 of the fishing reel cover 11 is constructed of a flexible material that is stretchable in a generally longitudinal direction (i.e., between the first and second end portions 35, 37 thereof).

The fishing reel cover 11 preferably includes attachment means 44 for removably attaching the first and second end portions 35, 37 to one another about the fishing reel 13. The attachment means 44 is preferably adjustable for allowing adjustment of the first and second end portions 35, 37 of the body member 32 relative to one another. For example, the attachment means 44 may include a first fastener member 45 attached to the first end portion 35 of the body member 32 and a second fastener member 47 attached to the second end portion 37 of the body member 32 for coacting with the first fastener member 45 in a manner to allow the first and second end portions 35, 37 to be adjustably attached to one another. For example, the first and second fastener members 45, 47 preferably consist of coacting portions of Velcro® brand fastening means or the like for allowing the body member 32 to be tightly attached to the fishing reel 13 as will now be apparent to those skilled in the art.

The fishing reel cover 11 may include hook means coupled to the first end portion 35 of the body member 32 for attachment to one of the cross bar member 26 of the fishing reel 13 to help attach the first end portion 35 of the body member 32 to the fishing reel 13. The hook means preferably includes at least one and preferably two hook members 49 attached to the first end portion 35 of the body member 32 for hooking over one of the cross bar members 26 of the fishing reel 13 as clearly shown in FIGS. 3 and 4. Each hook member 49 may be constructed out of metal or the like with one end thereof bent or otherwise formed into a hook to hook over one of the cross bar members 26 and with the other end thereof looped through an aperture 51 in the first end portion 35 of the body member 32 as clearly shown in FIG. 1. Metal reinforcing rivets 53 or the like preferably line the apertures 51.

Figure 5:
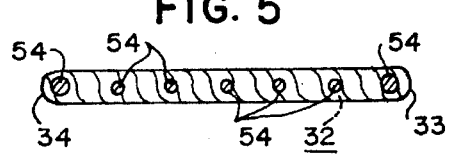
FIG. 5 is a sectional view substantially as taken on line 5—5 of FIG. 1 but showing an alternate construction of the body member of the fishing reel cover of FIG. 1.

A modified version of the body member 32 of the fishing reel cover 11 is shown in FIG. 5 in which a plurality of spaced elastic members 54 extend longitudinally through the body member 32 in such a manner that allows the body member 32 to stretch in a longitudinal direction. The stretch is optional as to where and how much. The elastic members 54 adjacent each outer edge of the body member 32 are preferably larger and/or stronger than the other elastic members 54 so that the outer edges of the body member 32 will bend over and seal against side edges of the side members 17, 19 of the fishing reel 13 as more fully explained hereinbelow relative to the modified version shown in FIG. 6. Such material can be manufactured in various manners now apparent to those skilled in the art.

Another modified version of the body member 32 of the fishing reel cover 11 is shown in FIG. 6 in which the outer edges of the body member 32 extend over the edges of the side members 17, 19. More specifically, a hem 55 is preferably formed in the side edges of the body member 32 and an elastic band 57 is preferably mounted in the hem 55 to thereby urge the side edges of the body member 32 over the edges of the side members 17, 19 as clearly shown in FIG. 6.

Figure 2:
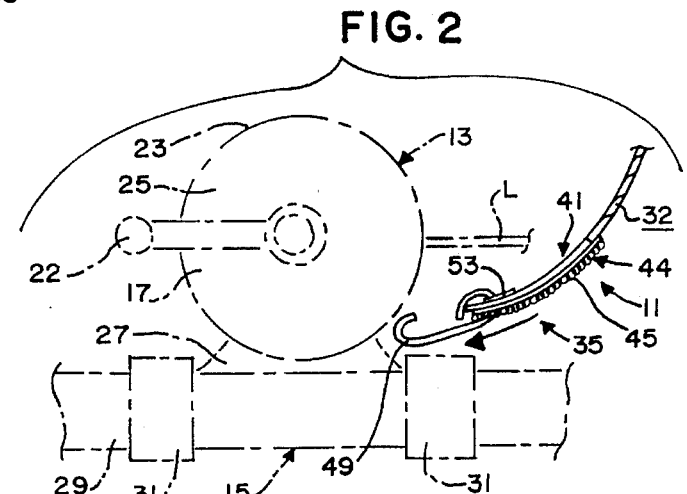
FIG. 2 is a sectional view of a portion the fishing reel cover of FIG. 1, shown being attached to a fishing reel that is mounted to a fishing rod.
Figure 3:
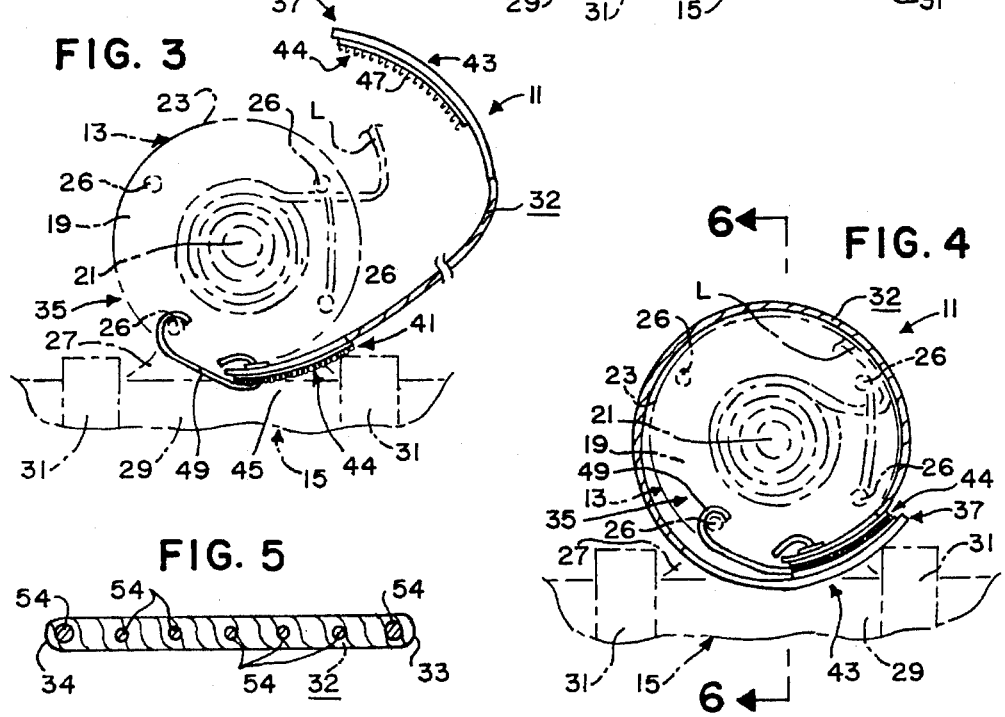
FIG. 3 is similar to FIG. 2 but shows a further progression of the attachment of the fishing reel cover of FIG. 1 to the fishing reel.
Figure 4:
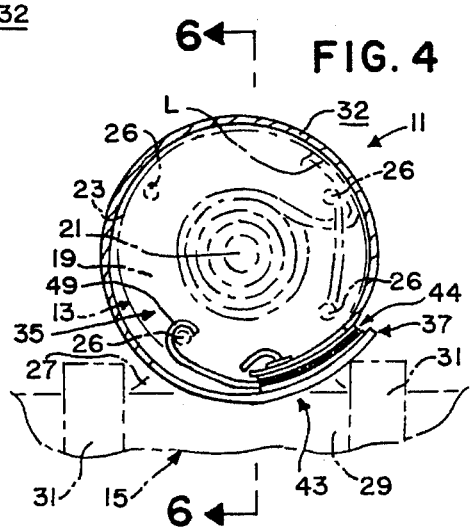
FIG. 4 is similar to FIGS. 2 and 3 but shows the fishing reel cover of FIG. 1 fully attached to the fishing reel.

To use the fishing reel cover 11, the hook members 49 are extended passed the mounting base shoe 27 and around one of the cross bar members 26 as shown diagrammatically in FIGS. 2–4. The second end portion 37 of the body member 32 can then be wrapped around the outer perimeter wall 23 of each side member 17, 19 and attached to the first end portion 35 with the attachment means 44. The distal end of the fishing line L wrapped about the spool 21 of the fishing reel 13 can be covered by the body member 32 or can extend through a slit or aperture through the body member 32.

The fishing reel cover 2.11 includes a flexible body member 2.32 for extending around or encircling the outer perimeter walls 23 of the first and second side members 17, 19 of the fishing reel 13 and for covering the rotatable spool 21 of the fishing reel 13. The body member 2.32 has a first side edge portion 2.33 and a second side edge portion 2.34.

The second side edge portion 2.34 is preferably tubular in shape (i.e., consisting of a continuous, closed loop) for sliding onto or being slipped or pulled over one of the side members 17, 19 of the fishing reel 13. The first side edge portion 2.33 of the body member 2.32 preferably includes a first end portion 2.35 for extending in one direction around the fishing reel 13, and a second end portion 2.37 for extending in an opposite direction around the fishing reel 13. The body member 2.32 has a slot 2.41 therein adjacent and between the first and second end portions 2.35, 2.37 of the first side edge portion 2.33 and the second side edge portion 2.34 for receiving the mounting base shoe 27 of the fishing reel 13 when the body member 2.32 extends around the fishing reel 11 with the mounting base shoe 27 of the fishing reel 13 attached to the fishing rod 5 as shown in FIG. 10. The body member 2.32 may be constructed in various manners and in various sizes, out of various materials, as will now be apparent to those skilled in the art. The body member 2.32 of the fishing reel cover 2.11 may be constructed of a stretchable material, a common stock heavy gauge material such as a heavy cloth commonly used for automobile seat covers, etc.

The fishing reel cover 2.11 preferably includes attachment means 2.44 for removably attaching the first and second end portions 2.35, 2.37 to one another about the fishing reel 13. The attachment means 2.44 may include a first fastener member 2.45 attached to the first end portion 2.35 of the body member 2.32 and a second fastener member 2.47 attached to the second end portion 2.37 of the body member 2.32 for coacting with the first fastener member 2.45 in a manner to removably attach the first and second end portions 2.35, 2.37 to one another. For example, the first and second fastener members 2.45, 2.47 preferably consist of coacting snap members or the like for allowing the body member 2.32 to be tightly attached to the fishing reel 13 as will now be apparent to those skilled in the art.

The fishing reel cover 2.11 may include one or more modified versions in which the side edges of the body member 2.32 extend over the edges of the side members 17, 19 of the fishing reel 13 substantially as disclosed hereinabove relative to the fishing reel cover 11 at FIGS. 5 and 6. Further, the fishing reel cover 2.11 may include a version in which the side edge portions 2.33, 2.34 are finished in a typical rolled hem stitch 2.58 as shown in FIG. 11. The rolled hem stitch 2.58 will gather the outer edges of the side edge portions 2.33, 2.34 in such a manner so that the overall length or circumference of the outer edges of the side edge portions 2.33, 2.34 will be reduced by 5 to 10% to cause the side edges of the body member 2.32 to extend over the edges of the side members 17, 19 of the fishing reel 13 substantially as shown in FIG. 11 and as will now be apparent to those skilled in the art.

To use the fishing reel cover 2.11, the tubular second side edge portion 2.34 is merely slid or pulled over the outer perimeter wall 23 of one of the side members 17, 19 of the fishing reel 13. The first and second end portions 2.35, 2.37 can then be wrapped around the outer perimeter wall 23 of the other side member 17, 19 and attached to one another with the attachment means 2.44. The distal end of the fishing line L wrapped about the spool 21 of the fishing reel 13 can be covered by the body member 2.32 or can extend through a slit or aperture through the body member 2.32.

The fishing reel cover 3.11 includes a flexible body member 3.32 for extending around the outer perimeter walls 23 of the first and second side members 17, 19 of the fishing reel 13 and for covering the rotatable spool 21 of the fishing reel 13. The body member 3.32 may be similar to the body member 2.32. The body member 3.32 is preferably cylindrical, consisting of an elongated tube or sleeve, and has an opened first end or side edge portion 3.33 and an opened second end or side edge portion 3.34 as clearly shown in FIG. 12. The second side edge portion 3.34 is preferably tubular in shape (i.e., consisting of a continuous, closed loop) for sliding onto or being slipped or pulled over one of the side members 17, 19 of the fishing reel 13. The first side edge portion 3.33 of the body member 3.32 preferably includes a first end portion 3.35 for extending in one direction around the fishing reel 13, and a second end portion 3.37 for extending in an opposite direction around the fishing reel 13. The body member 3.32 has a slot 3.41 therein adjacent and between the first and second end portions 3.35, 3.37 of the first side edge portion 3.33 and the second side edge portion 3.34 for receiving the mounting base shoe 27 of the fishing reel 13 when the body member 3.32 extends around the fishing reel 11 with the mounting base shoe 27 of the fishing reel 13 attached to the fishing rod 15 as shown in FIG. 13. The body member 3.32 may be constructed in various manners and in various sizes, out of various materials, as will now be apparent to those skilled in the art. Preferably, the body member 3.32 of the fishing reel cover 3.11 is constructed of a flexible tube or sleeve material that is stretchable in a generally circumferential direction such as typical elastic tube or sleeve stock used to construct ankle braces, knee braces, wrist braces and the like as will now be apparent to those skilled in the art. The slot 3.41 and end portions 3.35, 3.37 can be easily formed by merely cutting a T-shaped opening in the body member 3.32 from the first side edge portion 3.33 thereof as clearly shown in FIG. 12.

The fishing reel cover 3.11 preferably includes attachment means 3.44 for removably attaching the first and second end portions 3.35, 3.37 to one another about the fishing reel 13. The attachment means 3.44 may include a first fastener member 3.45 attached to the first end portion 3.35 of the body member 3.32 and a second fastener member 3.47 attached to the second end portion 3.37 of the body member 3.32 for coacting with the first fastener member 3.45 in a manner to removably attach the first and second end portions 3.35, 3.37 to be adjustably attached to one another. For example, the first and second fastener members 3.45, 3.47 preferably consist of coacting portions of Velcro® brand fastening means or the like for allowing the body member 3.32 to be tightly attached to the fishing reel 13 as will now be apparent to those skilled in the art.

The fishing reel cover 3.11 includes a first cap means 3.59 for closing or substantially closing the first side edge portion 3.33 of the body member 3.32, and a second cap means 3.61 for closing or substantially closing the second side edge portion 3.34 of the body member 3.32. The first cap means 3.59 preferably has a slot 3.63 or the like (see FIG. 12) for coacting with the first and second end portions 3.35, 3.37 of the first side edge portion 3.33 and for accommodating the crank 22 and related structure of the fishing reel 13 as shown in FIG. 13. The cap means 3.59, 3.61 may be constructed of a flexible material that is stretchable in one or more directions. The slot 3.63 can be easily formed by merely cutting a V-shaped opening in the cap means 3.59, etc., as will now be apparent to those skilled in the art. The cap means 3.59, 3.61 may be secured to the respective ends or edge portions 3.33, 3.34 of the body member 3.32 in any manner now apparent to those skilled in the art such as, for example, by being sewn thereto with stitches 3.65 as shown in FIG. 13. On the other hand, the cap means 3.59, 3.61 could be formed integral with body member 3.32.

To use the fishing reel cover 3.11, the tubular second side edge portion 3.34 is merely slid or pulled over the outer perimeter wall 23 of one of the side members 17, 19 of the fishing reel 13 in a direction from the second side member 19. The second cap means 3.61 will then fully cover the second side member 19 of the fishing reel 13 as shown in FIG. 13. The first and second end portions 3.35, 3.37 can then be wrapped around the outer perimeter wall 23 of the first side member 17 and attached to one another with the attachment means 3.44. As the first and second end portions 3.35, 3.37 are wrapped around the outer perimeter wall 23, the slot 3.63 of the first cap means 3.59 will be pulled around the crank 22 and related structure of the fishing reel 13 and portions of the first cap means 3.59 will approach or overlap one another to substantially cover the first side member 17 of the fishing reel 13 as shown in FIG. 13. Snap means or the like (not shown) may be provided on the cap means 3.59 adjacent the slot 3.63 between the apex and outer ends or mouth of the slot 3.63 for allowing the user of the fishing reel cover 3.11 to close the slot 3.63 around the base of the crank 22 to substantially completely seal the fishing reel 13 within the fishing reel cover 3.11 as will now be apparent to those skilled in the art. The distal end of the fishing line L wrapped about the spool 21 of the fishing reel 13 can be covered by the body member 3.32 or can extend through a slit or aperture (not shown) through the body member 3.32.

The fishing reel cover 4.11 includes a flexible body member 4.32 for extending around the outer perimeter walls 23 of the first and second side members 17, 19 of the fishing reel 13 and for covering the rotatable spool 21 of the fishing reel 13. The body member 4.32 may be similar to the body member 2.32. The body member 4.32 is preferably cylindrical, consisting of an elongated tube or sleeve, and has an opened first end or side edge portion 4.33 and an opened second end or side edge portion 4.34 as clearly shown in FIGS. 14 and 14. The second side edge portion 4.34 is preferably tubular in shape (i.e., consisting of a continuous, closed loop) for sliding onto or being slipped or pulled over one of the side members 17, 19 of the fishing reel 13. The first side edge portion 4.33 of the body member 4.32 preferably includes a first end portion 4.35 for extending in one direction around the fishing reel 13, and a second end portion 4.37 for extending in an opposite direction around the fishing reel 13. The body member 4.32 has a slot 4.41 therein adjacent and between the first and second end portions 4.35, 4.37 of the first side edge portion 4.33 and the second side edge portion 4.34 for receiving the mounting base shoe 27 of the fishing reel 13 when the body member 4.32 extends around the fishing reel 11 with the mounting base shoe 27 of the fishing reel 13 attached to the fishing rod 15 as shown in FIG. 16. The fishing reel cover 4.11 is especially designed for covering a fishing reel 11 of the type having an elongated nose N or the like as shown in FIG. 16. To accommodate such an elongated nose N, the body member 4.32 includes a pocket portion 4.42 adjacent the front end thereof. The pocket portion 4.42 may be formed simply by a hem formed by stitches S along a portion of each side edge portion 4.33, 4.34 as clearly shown in FIGS. 14–16. On the otherhand, the pocket portion 4.42 could be woven, molded or otherwise formed in the body member 4.32 as will now be apparent to those skilled in the art. In addition, the fishing reel cover 4.11 may be adapted for use with a fishing reel 11 of the type having a button 24 or the like that extends outwardly of one of the outer perimeter walls 23, 25 thereof as shown in FIG. 16 for allowing the user thereof to release the spool 21 from the crank 22 as will now be apparent to those skilled in the art. The body member 4.32 may include an opening 4.43 therein as clearly shown in FIGS. 15 and 16 for allowing the button 24 to extend therethrough. Stitches S may extend around the opening 4.43 to reinforce and strengthen the edges of the opening 4.43, etc. The body member 4.32 may be constructed in various manners and in various sizes, out of various materials, as will now be apparent to those skilled in the art. Preferably, the body member 4.32 of the fishing reel cover 4.11 is constructed of a flexible material that is stretchable in at least one direction such as typical knit elastic such as the Stretchrite® knit elastic manufactured by Rhode Island Textile Company, Pawtucket, R.I. 92862, The slot 4.41 and end portions 4.35, 4.37 can be easily formed by merely cutting a T-shaped opening in the body member 4.32 from the first side edge portion 4.33 thereof as shown in FIG. 14.

The fishing reel cover 4.11 preferably includes attachment means 4.44 for removably attaching the first and second end portions 4.35, 4.37 to one another about the fishing reel 13. The attachment means 4.44 may include a first fastener member 4.45 attached to the first end portion 4.35 of the body member 4.32 and a second fastener member 4.47 attached to the second end portion 4.37 of the body member 4.32 for coacting with the first fastener member 4.45 in a manner to removably attach the first and second end portions 4.35, 4.37 to be adjustably attached to one another. For example, the first and second fastener members 4.45, 4.47 preferably consist of coacting portions of Velcro® brand fastening means or the like for allowing the body member 4.32 to be tightly attached to the fishing reel 13 as will now be apparent to those skilled in the art.

The side edge portions 4.33, 4.34 of the body member 4.32 of the fishing reel cover 4.11 are preferably finished in a typical rolled hem stitch 4.58 as shown in FIGS. 14–16. The rolled hem stitch 4.58 will gather the outer edges of the side edge portions 4.33, 4.34 in such a manner so that the overall length or circumference of the outer edges of the side edge portions 4.33, 4.34 will be reduced by 5 to 10% to cause the side edges of the body member 4.32 to extend over the edges of the side members 17, 19 of the fishing reel 13 as will now be apparent to those skilled in the art.

To use the fishing reel cover 4.11, the tubular second side edge portion 4.34 is merely slid or pulled over the outer perimeter wall 23 of one of the side members 17, 19 of the fishing reel 13 in a direction from the second side member 19. The first and second end portions 4.35, 4.37 can then be wrapped around the outer perimeter wall 23 of the first side member 17 and attached to one another with the attachment means 4.44. The distal end of the fishing line L wrapped about the spool 21 of the fishing reel 13 can be covered by the body member 4.32 or can extend through a slit or aperture (not shown) through the body member 4.32.

The fishing reel cover 5.11 includes a flexible body member 5.32 for extending around the outer perimeter walls 23 of the first and second side members 17, 19 of the fishing reel 13 and for covering the rotatable spool 21 of the fishing reel 13. The body member 5.32 may be similar to the body member 3.32. The body member 5.32 is preferably cylindrical, consisting of an elongated tube or sleeve, and has an opened first end or side edge portion 5.33 and a closed second end 5.34 as clearly shown in FIGS. 17 and 18. The second end 5.34 is preferably tubular in shape (i.e., includes a continuous, closed cup or loop) for sliding onto or being slipped or pulled over one of the side members 17, 19 of the fishing reel 13. The first side edge portion 5.33 of the body member 5.32 preferably includes a first end portion 5.35 for extending in one direction around the fishing reel 13, and a second end portion 5.37 for extending in an opposite direction around the fishing reel 13. The body member 5.32 has a slot 5.41 therein adjacent and between the first and second end portions 5.35, 5.37 of the first side edge portion 5.33 and the second side edge portion 5.34 for receiving the mounting base shoe 27 of the fishing reel 13 when the body member 5.32 extends around the fishing reel 11 with the mounting base shoe 27 of the fishing reel 13 attached to the fishing rod 15 as shown in FIG. 18. The body member 5.32 may be constructed in various manners and in various sizes, out of various materials, as will now be apparent to those skilled in the art. Preferably, the body member 5.32 of the fishing reel cover 5.11 is constructed of a flexible material that is stretchable in at least one direction such as typical knit elastic such as the Stretchrite® knit elastic manufactured by Rhode Island Textile Company, Pawtucket, R.I. 92862, The slot 5.41 and end portions 5.35, 5.37 can be easily formed by merely cutting a T-shaped opening in the body member 5.32 from the first side edge portion 5.33 thereof as shown in FIG. 17.

The fishing reel cover 5.11 preferably includes attachment means 5.44 for removably attaching the first and second end portions 5.35, 5.37 to one another about the fishing reel 13. The attachment means 5.44 may include a first fastener member 5.45 attached to the first end portion 5.35 of the body member 5.32 and a second fastener member 3.47 attached to the second end portion 3.37 of the body member 5.32 for coacting with the first fastener member 5.45 in a manner to removably attach the first and second end portions 5.35, 5.37 to be adjustably attached to one another. For example, the first and second fastener members 5.45, 5.47 preferably consist of coacting portions of Velcro® brand fastening means or the like for allowing the body member 5.32 to be tightly attached to the fishing reel 13 as will now be apparent to those skilled in the art.

The first side edge portion 5.33 of the body member 5.32 of the fishing reel cover 5.11 is preferably finished in a typical rolled hem stitch 5.58 as shown in FIGS. 17 and 18. The rolled hem stitch 5.58 will gather the outer edge of the first side edge portion 5.33 in such a manner so that the overall length or circumference of the outer edge of the side edge portion 5.33 will be reduced by 5 to 10% to cause the first side edge of the body member 5.32 to extend over the edges of the side members 17, 19 of the fishing reel 13 as shown in FIG. 18 and as will now be apparent to those skilled in the art. The second end 5.34 of the body member 5.32 may be closed by merely forming a seam 5.61 thereacross with stitches S as the body member 5.32 is formed. This can be easily done by cutting a pattern for the body 5.32 out of the knit elastic or the like, then sewing the body 5.32 in a reverse manner, and then inverting the sewn body 5.32 as will now be apparent to those skilled in the art.

To use the fishing reel cover 5.11, the tubular second side edge portion 5.34 is merely slid or pulled over the outer perimeter wall 23 of one of the side members 17, 19 of the fishing reel 13 in a direction from the second side member 19. The first and second end portions 5.35, 5.37 can then be wrapped around the outer perimeter wall 23 of the first side member 17 and attached to one another with the attachment means 5.45. The distal end of the fishing line L wrapped about the spool 21 of the fishing reel 13 can be covered by the body member 5.32 or can extend through a slit or aperture (not shown) through the body member 5.32.

Although the present invention has been described and illustrated with respect to preferred embodiments and preferred uses therefor, it is not to be so limited since modifications and changes can be made therein which are within the full intended scope of the invention.

I claim:
1. In combination, a fishing rod, a fishing reel and a fishing reel cover;

said fishing reel including a first side member, a second side member, and a rotatable spool extending between said first and second side members;

each of said first and second side members having an outer perimeter wall;

said fishing reel cover including a flexible body member for extending around said outer perimeter walls of said first and second side members of said fishing reel and for covering said rotatable spool of said fishing reel;

said body member of said fishing reel cover including a first end portion for extending in one direction around said fishing reel, and including a second end portion for extending in an opposite direction around said fishing reel;

said fishing reel cover including attachment means for removably attaching said first and second end portions to one another about said fishing reel;

said fishing reel including a mounting base shoe for securing to said fishing rod;

said first end portion of said body member of said fishing reel cover having a slot therein for receiving said mounting base shoe of said fishing reel when said body member extends around said fishing reel with said mounting base shoe of said fishing reel attached to said fishing rod;

said first side member of said fishing reel having an outside face wall;

said body member of said fishing reel cover having a first side edge portion for covering a portion of said outside face wall of said first side member of said fishing reel;

said second side member of said fishing reel having an outside face wall;

said body member of said fishing reel cover having a second side edge portion for covering a portion of said outside face wall of said second side member of said fishing reel;

first urging means for urging said first side edge portion of said body member over a portion of said outside face wall of said first side member of said fishing reel;

and in which is included second urging means for urging said second side edge portion of said body member over a portion of said outside face wall of said second side member of said fishing reel.

2. The combination of claim 1 in which said first urging means includes elastic means attached to said first side edge portion of said body member for urging said first side edge portion of said body member over a portion of said outside face wall of said first side member of said fishing reel;

and in which said second urging means includes elastic means attached to said second side edge portion of said body member for urging said second side edge portion of said body member over a portion of said outside face wall of said second side member of said fishing reel.

3. In combination a fishing rod, a fishing reel and a fishing reel cover;

said fishing reel including a first side member, a second side member, and a rotatable spool extending between said first and second side members;

each of said first and second side members having an outer perimeter wall;

said fishing reel cover including a flexible body member for extending around said outer perimeter walls of said first and second side members of said fishing reel and for coveting said rotatable spool of said fishing reel;

said body member of said fishing reel cover including a first end portion for extending in one direction around said fishing reel, and including a second end portion for extending in an opposite direction around said fishing reel;

said fishing reel cover including attachment means for removably attaching said first and second end portions to one another about said fishing reel;

said fishing reel including a mounting base shoe for securing to said fishing rod;

said first end portion of said body member of said fishing reel cover having a slot therein for receiving said mounting base shoe of said fishing reel when said body member extends around said fishing reel with said mounting base shoe of said fishing reel attached to said fishing rod;

said first side member of said fishing reel having an outside face wall;

said body member of said fishing reel cover having a first side edge portion for covering a portion of said outside face wall of said first side member of said fishing reel;

said second side member of said fishing reel having an outside face wall;

said body member of said fishing reel cover having a second side edge portion for covering a portion of said outside face wall of said second side member of said fishing reel;

said body member having a continuous loop adjacent said second side edge portion for sliding onto said outer perimeter wall of said second side member of said fishing reel.

4. In combination, a fishing reel and a fishing reel cover;

said fishing reel including a first side member, a second side member, and a rotatable spool extending between said first and second side members;

each of said first and second side members having an outer perimeter wall;

said fishing reel cover including a flexible body member for extending around said outer perimeter walls of said first and second side members of said fishing reel and for covering said rotatable spool of said fishing reel;

said body member of said fishing reel cover including a first end portion for extending in one direction around said fishing reel, and including a second end portion for extending in an opposite direction around said fishing reel;

said fishing reel cover including attachment means for removably attaching said first and second end portions to one another about said fishing reel;

said attachment means including adjustable attachment means for allowing adjustment of said first and second end portions of said body member relative to one another.

5. In combination, a fishing rod, a fishing reel and a fishing reel cover;

said fishing reel including a first side member, a second side member, and a rotatable spool extending between said first and second side members;

each of said first and second side members having an outer perimeter wall;

said fishing reel cover including a flexible body member for extending around said outer perimeter walls of said first and second side members of said fishing reel and for covering said rotatable spool of said fishing reel;

said body member of said fishing reel cover including a first end portion for extending in one direction around said fishing reel, and includes a second end portion for extending in an opposite direction around said fishing reel;

said fishing reel cover including attachment means for removably attaching said first and second end portions to one another about said fishing reel;

said fishing reel including a mounting base shoe for securing to said fishing rod;

said first end portion of said body member of said fishing reel cover having a slot therein for receiving said mounting base shoe of said fishing reel when said body member extends around said fishing reel with said mounting base shoe of said fishing reel attached to said fishing rod;

said fishing reel including at least one cross bar member extending between said first and second side members thereof;

said fishing reel cover including at least one hook means attached to said first end portion of said body member of said fishing reel cover for attachment to said cross bar member of said fishing reel.

6. In combination, a fishing reel and a fishing reel cover;

said fishing reel including a first side member, a second side member, and a rotatable spool extending between said first and second side members;

each of said first and second side members having an outer perimeter wall;

said fishing reel cover including a flexible body member for extending around said outer perimeter walls of said first and second side members of said fishing reel and for covering said rotatable spool of said fishing reel;

said body member is cylindrical and has an opened first end and an opened second end for being pulled over said outer perimeter walls of said first and second side members of said fishing reel.

7. The combination of claim 6 including a first cap means attached to said opened first end of said body member;

and including a second cap means attached to said opened second end of said body member.

8. The combination of claim 7 including a fishing rod;

in which said fishing reel includes a mounting base shoe for securing to said fishing rod;

and in which said body member of said fishing reel cover has a slot therein for receiving said mounting base shoe of said fishing reel when said body member is pulled over said outer perimeter walls of said first and second side members of said fishing reel.

9. The combination of claim 8 in which said fishing reel has a crank; and in which said first cap means has a slot therein for allowing said crank of said fishing reel to extend therethrough when said body member is pulled over said outer perimeter walls of said first and second side members of said fishing reel.

10. In combination, a fishing reel and a fishing reel cover;

said fishing reel including a first side member, a second side member, and a rotatable spool extending between said first and second side members;

each of said first and second side members having an outer perimeter wall;

said fishing reel cover including a flexible body member for extending around said outer perimeter walls of said first and second side members of said fishing reel and for covering said rotatable spool of said fishing reel;

said fishing reel having a nose portion;

said body member having a pocket portion for receiving said nose portion of said fishing reel;

said fishing reel has a button extending from said outer perimeter wall of said second side member thereof and in which said body member has an opening for allowing said button of said fishing reel to extend therethrough.

11. In combination, a fishing reel and a fishing reel cover;

said fishing reel including a first side member, a second side member, and a rotatable spool extending between said first and second side members;

each of said first and second side members having an outer perimeter wall;

said fishing reel cover including a flexible body member for extending around said outer perimeter walls of said first and second side members of said fishing reel and for covering said rotatable spool of said fishing reel;

said body member having an opened first end and a closed second end.

* * * * *